Dec. 11, 1962
H. W. LEHMAN
3,067,633
SHAFT POSITIONING MEANS
Filed Dec. 21, 1959
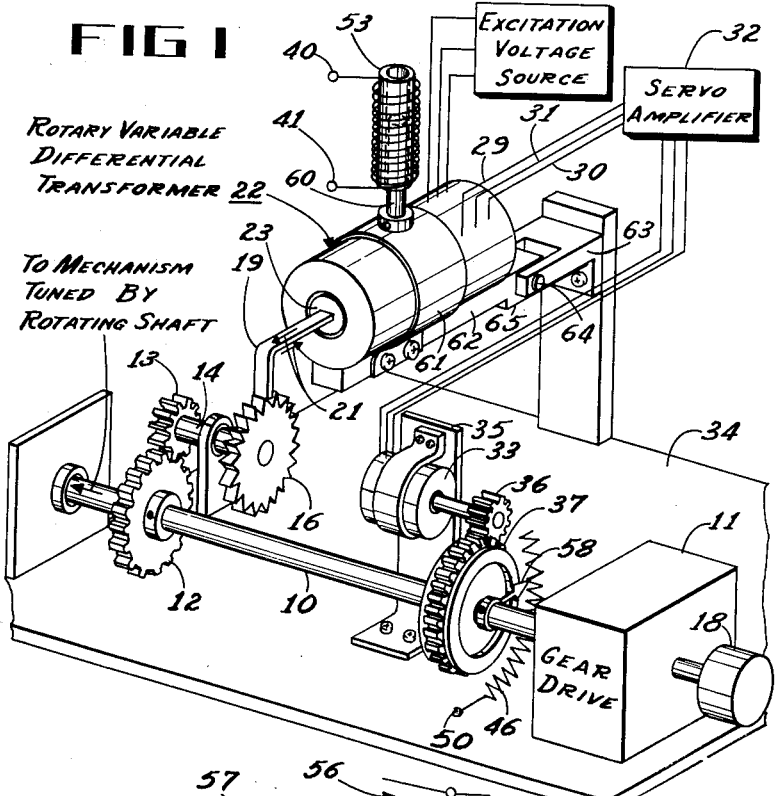
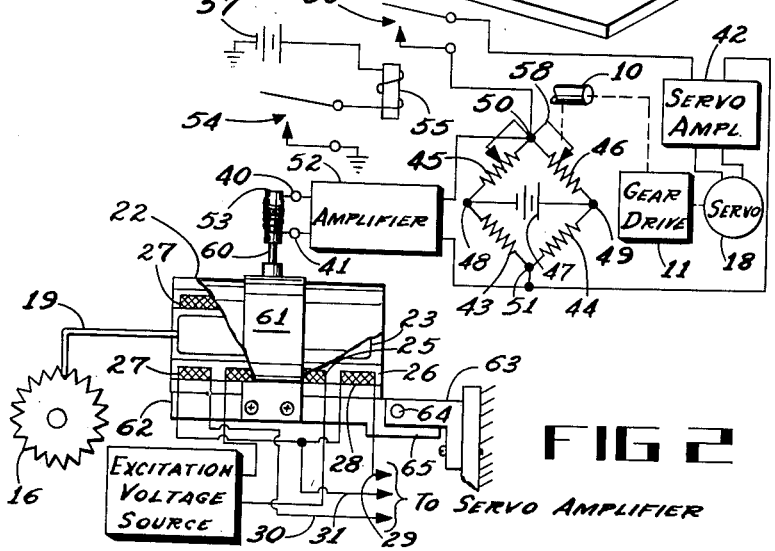
INVENTOR.
HARRY W. LEHMAN
BY *Moody and Phillips*
ATTORNEYS United States Patent Office 3,067,633
Patented Dec. 11, 1962

3,067,633
SHAFT POSITIONING MEANS
Harry W. Lehman, Marion, Iowa, assignor to Collins Radio Company, Cedar Rapids, Iowa, a corporation of Iowa
Filed Dec. 21, 1959, Ser. No. 861,077
6 Claims. (Cl. 74—815)

This invention relates generally to means of compensating for errors in the angular positioning of a shaft, and more particularly relates to means for detecting and correcting smaller random irregularities in shaft angular position than has heretofore been possible.

The source of error in the angular positioning of a rotatable shaft by a gear train arises from a number of conditions. These conditions arise from the necessary tolerances in manufacturing the gears and other mechanical parts, backlash, the wearing of gears and other coupling means due to continued use, torsion introduced in gears and shafts which can vary in accordance with different angular positions or load on the mechanism, and thermal stresses which might be introduced into the mechanism. It is to be noted that although some of the above-mentioned conditions would appear to introduce very small errors into the system, the cumulative effect of such errors can be sufficient to be series. For example, in a certain application it is necessary to set a shaft in various discrete angular positions which vary an angular distance from each other by one-tenth of a degree. The permissible tolerance in such an application is plus or minus 15%, which means that the shaft must be adjustable to within a tolerance of the order of one minute.

The type errors that can occur in a gear train can be divided into two general categories. One type error might be classed as uni-cylical and reoccurs with each revolution of an output shaft, i.e., if the output shaft in a given angle position has an error of 1° then, if said shaft is rotated through 360° it will again have an error of 1° at the new shaft position. This type error is fairly easily compensated in many cases.

The other type error which can occur is more difficult to correct. This type error changes with each cycle of the shaft and may be said to be multi-cyclical. More specifically, in one given angular position the shaft may have an error of say 1°. If the shaft is then rotated through a complete 360° the error may change to 2° or to 2½°. One of the principal causes for this type error lies in the fact that there may be slight eccentricities in some of the gear, i.e., the axis of rotation of the gear is not at the same point as the center of the pitch diameter of the gear. Gear trains using gears of various pitch-diameters are subject to errors of this type.

These small eccentricities will function in somewhat the same manner as occurs in the combining of several sine wave signals of different frequencies. The result is an increase of the size of the error over several cycles, perhaps, and then a diminishing of the size of the error for several cycles. The resultant error function may be, in fact, a rather complex one and not readily correctable.

It is an object of the present invention to provide a shaft position detecting and correcting structure which will function to correct multi-cyclical as well as unicyclical positions of a rotatable shaft.

Another object of the present invention is to provide a shaft position detecting and correcting structure which is considerably more accurate than known prior art devices.

A further object of the invention is a relatively simple, inexpensive, and easy to maintain shaft position detecting and correcting mechanism.

A fourth object is to improve shaft position detecting and correcting mechanism generally.

FIG. 1 shows a perspective view of the mechanical portion of the invention; and
FIG. 2 illustrates a schematic sketch of an electrical circuit which can be employed in the invention.

Referring now to FIG. 1, shaft 10 may be rotated in discrete steps by a suitable driving means indicated generally by the gear box 11 and the servo motor 18. Means, shown in FIG. 2, are provided to cause the servo motor 18 to rotate in discrete angular steps, which angular rotation is transferred through the step-down gear drive mechanism 11 to rotate the shaft 10 in the aforementioned discrete steps. The specific means for controlling the angular position or rotation of the servo motor 18 will be discussed in more detail later herein in connection with FIG. 2. For the present it is convenient to assume that such discrete angular positions of the servo motor 18 are obtained.

The shaft 10 is connected to the mechanism to be controlled. For example, such mechanism may be a variable inductor, a variable capacitor, or a variable resistor. Specific applications (not shown) of the device would occur in the case of tuned amplifiers or oscillators, for example. It is to be noted that the mechanism controlled or tuned by the shaft 10 is not shown since such mechanism does not, in and of itself, comprise a portion of the invention.

As indicated hereinbefore it frequently happens that the desired discrete position of the shaft 10 is not obtained with sufficient accuracy. It is to improve the degree of such accuracy that this invention is directed. The specific structure employed to obtain such improved accuracy is as follows.

A gear 12 is securely affixed to the shaft 10 and is caused to drive pinion gear 13 which in turn is securely affixed to the shaft 14. At the other end of the shaft 14 there is securely affixed thereto a circularly shaped element 16 having notched teeth on the perimeter thereof. Such circularly shaped element will hereinafter be referred to as toothed wheel 16. The purpose of the linkage means consisting of gears 12 and 13 is to amplify angular error and, consequently, increase the sensitivity of the toothed wheel 16. The ratios of the diameters of the gears 13 and 12 and the number of teeth on the toothed wheel 16 have such a relationship with each other that the toothed wheel 16 will rotate an angular distance equal to the distance between two adjacent teeth in response to the rotation of the shaft 10 from one of its discrete angular positions to its next adjacent discrete angular position. Worded in another way, the wheel 16 is constructed so that the notches formed thereon will each in turn assume a predetermined point in the perimetric path of said wheel in response to the rotation of shaft 10 through its various discrete positions. Consequently, if there was no error in the system, the root of each notch in the toothed wheel 16 would always lie directly under the pawl 19, assuming that the pawl 19 were initially adjusted to lie directly over the correct position of any root of any notch in the wheel 16. However, due to the fact that error does exist in the discrete angular positions of the shaft 10 and thus of the wheel 16, the roots of the notches on the wheel 16 will not always lie directly underneath the pawl 19. However, the pawl 19 is movable back and forth in the direction of the arrows 21 so that as the pawl 19 is brought down into the notches of the wheel 16, it, the pawl 19, will move backward or forward to lie at the base (or root) of a particular notch. In moving back and forth the pawl 19 will have an effect on the rotary variable differential transformer 22, whereby the magnitude and phase of the output signal thereof will vary in response to the longitudinal position of pawl 19. The operation of the differential transformer 22 will be discussed in detail later herein.

At this point it should be noted that each time the shaft 10 is rotated to a new angular position the entire transformer 22, and thus the pawl 19, are raised upward so that the wheel 16 can turn freely under the pawl 19. After the angular motion of the shaft 10 has been completed, circuit means (shown in FIG. 2) are provided whereby the entire transformer 22 and the pawl 19 also are caused to be lowered so that the pawl 19 drops into the root of one of the notches of the wheel 16.

The variable differential transformer 22 is constructed to produce an output signal which is either of a given phase or a phase 180° removed therefrom. The amplitude and the phase of the output signal is determined by the position of the magnetic core 23. As the core 23 moves from one extreme position to the other extreme position, the amplitude of the output signal will vary from a maximum amplitude gradually down to zero amplitude, at which time the core is at mid-point, and then as the core moves beyond mid-point, the amplitude will again increase toward a maximum value but with a phase 180° removed from the phase of the signal generated when the core was on the other side of its mid-point position. In FIG. 2 the construction of the transformer 22 is shown in more detail. The primary winding 25 is wound in the center of a winding form 26 which may be of an insulative material. The transformer is equipped with two secondary windings 27 and 28 which are wound around the insulating form 26, one of said secondary windings being located on either side of the primary winding 25. The core 23 is positioned within these three windings as shown in FIG. 2. When the core 23 is in its center position or mid-point as shown in FIG. 2, the voltage induced in each of the secondary windings is of the same magnitude since the magnetic coupling (through the core 23) between the primary winding 25 and the two secondary windings 27 and 28 is equal. However, if the core 23 is moved either to the left or to the right in FIG. 2, it is apparent that the magnetic coupling will increase between the primary winding 25 and one or the other of the secondary windings 27 or 28 and will decrease between the other secondary winding. More specifically, if the core 23 is moved to the left, the magnetic coupling between primary winding 25 and secondary winding 28 will decrease. Thus the voltage induced in winding 27 will be greater than that induced in winding 28. Now, since the windings 27 and 28 are wound so as to produce output voltages of opposite phase, the resultant voltage across conductors 29 and 30 will have a phase and amplitude dependent directly upon the magnitudes of the two voltages induced in windings 27 and 28. The center conductor 31 is common to both secondary windings 27 and 28 and could be grounded or handled in any other suitable manner. The leads 29, 30, and 31 are connected to a servo amplifier 32 shown in FIG. 1 which in turn supplies the amplified output signal to the servo motor 33 which is affixed to the chassis 34 by means of bracket arrangement 35. The servo motor 33 will respond to the output signal of the servo amplifier 32 to rotate the shaft 10, through gear 36 and differential gear 37, in such a direction that the toothed gear 16 will be rotated slightly to move the pawl 19 in such a direction as to drive the magnetic core 23 of transformer 22 toward its mid-point position. When such mid-point position is reached, the output signal of the transformer 22 is balanced and the servo motor 33 no longer is caused to rotate.

Thus the toothed wheel 16 has been caused to assume a correct position determined by the mid-point of the magnetic core 23. It will be apparent that the base or root of any notch in the wheel 16 under the pawl 19 will thus always assume the same fixed position with respect to the center position of the magnetic core 23, to which the pawl 19 it attached. Since the notches in the wheel 16 do represent an accurate positioning of the shaft 10, it, of course, follows that when the wheel 16 is accurately positioned, the shaft 10 will be positioned accurately.

As indicated hereinbefore, the entire transformer assembly 22 is raised each time the shaft 10 is moved to a new angular position. The mechanism for raising transformer 22 is shown in FIG. 2 and has the general overall function of raising the transformer 22 immediately before the shaft 10 is rotated and then lowering the transformer 22 immediately after the shaft 10 has completed its rotation and has assumed its new angular position.

In general, the above-mentioned function can be accomplished by the servo motor 18, a second servo amplifier 42, the gear drive 11, a bridge circuit comprised of fixed resistors 43 and 44, and variable resistors 45 and 46. A battery 47 is connected across diagonal points 48 and 49 of the bridge. When the bridge is balanced, no voltage will appear across terminals 50 and 51. Consequently, the solenoid 53 will be in a de-energized state, so that the transformer 22 will be in its lowered position as shown in FIG. 2. If desired, suitable braking means can be provided to restrain angular movement of the rotor of servo 18 during the time the servo 18 is de-energized. Such braking means will prevent rotation of the servo 18 rotor when the position of shaft 10 is corrected by the servo 33.

If it is desired to change the angular position of the shaft 10, the value of the variable resistor 45 is altered by a predetermined amount. The resistor 45 can be any suitable structure whereby values of resistance can be added or subtracted in predetermined discrete amounts. Such resistors are very well known in the art and will not be described in detail herein. Changing the value of resistor 45 will unbalance the bridge and produce a voltage across the terminals 50 and 51. Such voltage will be amplified by the amplifier 52 to produce an output signal therefrom which will energize the solenoid (or electromagnet) 53 and raise the transformer assembly 22 in its "up" position by magnetically energizing the solenoid core 60 which is fastened securely to the bracket 61. Thereby the pawl 19 will be raised clear of the teeth of the wheel 16 to permit the wheel 16 to rotate freely. Energization of electromagnet 53 also functions to close contact 54 which in turn energizes relay 55 through battery 57 to close contacts 56. Closure of contacts 56 functions to apply the voltage appearing across terminals 50 and 51 to the servo amplifier 42. The output signal of servo amplifier 42 will energize the servo motor 18 to drive the gear drive 11. The gear drive 11 in turn will rotate the shaft 10. A contact arm 58 is shown schematically as being rigidly secured to the shaft 10. As the shaft 10 turns, the contact arm 58 will vary the value of the resistor 46 until the bridge again becomes balanced. At such time the voltage across terminals 50 and 51 will decrease to zero value so that two things will occur. Firstly, the servo motor 18 will cease its rotation, thus providing the new course position for the shaft 10. Secondly, the electromagnet 53 will become de-energized to permit the transformer assembly 22 to assume its lower position so that pawl 19 engages wheel 16.

Additionally upon de-energization of the electromagnet 53 the contacts 54 will break and cause de-energization of relay 55. De-energization of relay 55 will break contacts 56 which will open up the energizing circuit for the servo motor 18 and thus prevent further rotation of the shaft 10 (only a small part of which is shown in FIG. 2), until the resistor 45 is again altered to unbalance the bridge circuit.

As indicated above the core 60 of the solenoid 53 is secured to a bracket 61 which holds the transformer 22 and which is in turn secured to an arm 62. The arm 62 is pivoted between the arms of the U-shaped bracket 63 by means of pivot pin 64. An extension 65 of the arm 62 extends under the rear portion of the U-shaped bracket 63 so as to limit the downward motion of the transformer 22. The upward motion of the transformer 22 is limited by the base of the element 60 making physical contact with the electromagnet 53 which is secured with respect to base 34.

It is to be noted that the form of the invention herein shown and described is but a preferred embodiment thereof and that various changes may be made in circuit arrangements and physical configurations without departing from the spirit or the scope of the invention.

I claim:

1. Shaft positioning means comprising a rotatable shaft, means for rotating said rotatable shaft into discrete angular positions, a rotatable wheel having notches formed in the perimeter thereof, linkage means responsive to the rotation of said rotatable shaft for rotating said rotatable wheel by predetermined angular amounts, said rotatable wheel being constructed so that the notches formed thereon will each in turn assume a predetermined point in the perimetric path of the said rotatable wheel in accordance with a predetermined position of said rotatable shaft, pawl means constructed to engage and to be positioned by the particular notch at said predetermined point in the perimetric path of said rotatable wheel, transducer means constructed to respond to the position of said pawl means to produce an output signal representative of the deviation of the position of said particular notch with respect to said predetermined point in the perimetric path of said rotatable wheel, electromechanical means responsive to said output signal to rotate said rotatable shaft in an angular direction to correct said deviation of the position of said particular notch.

2. Shaft positioning means in accordance with claim 1 in which said transducer means is constructed to produce an output signal whose amplitude is representative of the amount of deviation of the position of said particular notch and whose phase is representative of the sense of the deviation of the position of said particular notch from said predetermined point.

3. Shaft positioning means in accordance with claim 2 in which said electromechanical means comprises a servo motor means responsive to said output signal to rotate in a direction in accordance with the phase of said output signal, and means for coupling the rotational movement of said servo motor means to said rotatable shaft to rotate said rotatable shaft to correct the deviation of the position of said particular notch from said predetermined point.

4. In a system comprising a rotatable shaft, means for rotating said rotatable shaft into predetermined discrete angular positions, correcting means for correcting deviations from the predetermined angular positions, said correcting means comprising a wheel having notches in the perimeter thereof, linkage means responsive to the rotation of said rotatable shaft to rotate said wheel, said wheel being constructed so that the base of each notch will stop at substantially the same predetermined point in the perimetric path of said wheel in response to the positioning of said rotatable shaft in a predetermined one of its predetermined discrete angular positions, pawl means for engaging the particular notch at said predetermined point in the perimetric path of said wheel, transducer means constructed to be responsive to the position of said pawl means to produce an output signal indicative of the amount and sense of deviation of said notch with respect to the said perimetric point, electromechanical means responsive to said output signal to cause said rotatable shaft to rotate in a direction to correct said deviation of said particular notch from said predetermined perimetric point, and means for lifting said pawl means out of the path of said notched wheel immediately before said rotatable shaft is rotated from one of its discrete angular positions to another of its discrete angular positions and for causing said pawl means to re-engage said wheel after completion of rotation of said rotatable shaft into said other discrete angular position.

5. In a system in accordance with claim 4 in which said transducer means is constructed to produce an output signal whose amplitude is representative of the amount of deviation of said particular notch and whose phase is representative of the sense of the deviation of said particular notch from said predetermined point.

6. In a system in accordance with claim 5 in which said electromechanical means comprises a servo motor means responsive to said output signal to rotate in a direction in accordance with the phase of said output signal, and means for coupling the rotational movement of said servo motor means to said rotatable shaft to rotate said rotatable shaft to correct the deviation of the position of said notch from said predetermined perimetric point.

References Cited in the file of this patent

UNITED STATES PATENTS

| | | |
|---|---|---|
| 1,564,872 | McMullen | Dec. 8, 1925 |
| 2,575,792 | Bullard | Nov. 20, 1951 |
| 2,676,289 | Wulfsberg et al. | Apr. 20, 1954 |
| 2,696,578 | Newell | Dec. 7, 1954 |
| 2,807,175 | Tandler et al. | Sept. 24, 1957 |
| 2,927,483 | Turner | Mar. 8, 1960 |
| 2,985,038 | Tandler et al. | May 23, 1961 |